Sept. 30, 1969     G. E. HELMKE     3,469,369

METHOD FOR PREPARING AND APPLYING A VISCOUS FLUID

Filed Dec. 29, 1966

INVENTOR
G. E. HELMKE
BY Charles E. Graves

ATTORNEY 3,469,369
METHOD FOR PREPARING AND APPLYING A VISCOUS FLUID
George E. Helmke, Bernards Township, Somerset County, N.J., assignor to Bell Telephone Laboratories, Incorporated, Murray Hill and Berkeley Heights, N.J., a corporation of New York
Filed Dec. 29, 1966, Ser. No. 605,690
Int. Cl. B01d 19/00
U.S. Cl. 55—46     1 Claim

ABSTRACT OF THE DISCLOSURE

A process is disclosed for introducing a viscous epoxy resin at a temperature range of 50 to 60° C. into the upper of two chambers which are separated by a membrane-type filter of pore size in the range of 0.05 to 10.0 microns and outgassing the filter and the lower of said two chambers. The resin is thereafter forced through the filter by inert gas pressure. Degassing the resin in the lower chamber by maintaining the vacuum therein for about 5 to 10 minutes is then followed by applying the resin directly from the lower chamber onto a substrate.

---

Figure 1:
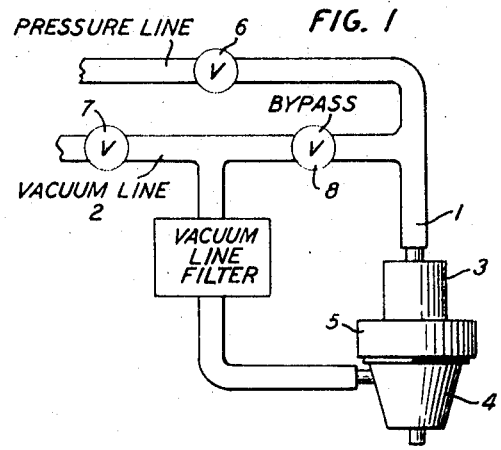

This invention relates generally to purification of high viscosity fluids; and more specifically concerns a method of pressure filtering and vacuum outgassing of such fluids.

Occasionally it is critical that a high viscosity fluid (100 to 10,000 cps.) be thoroughly freed of microparticles and bubbles to meet the requirements of a given end product. Examples of such cases include achieving exceedingly thin acoustic bonds with epoxy resins, realizing very fine edge definition with photo resist materials, reducing light scattering impurities in optical adhesive materials, producing encapsulants free of microbiological contaminants, and reducing the particulate contamination level in precision device lubricants.

The various current filtering and outgassing procedures, however, exhibit one or more disadvantages when confronted with both high viscosity fluids and a submicron pore size filter, and the result is a filtrate too impure for the above cases. One problem, for example, is that the filtering and outgassing steps typically are physically separated and there is thus a chance for particles to recontaminate the fluid during handling. Further, the filter itself is a source of bubbles, their size depending on the filter pore size. In low viscosity fluids these bubbles readily rise to the surface and disperse, but in fluids of high viscosity the bubble movement, especially of small bubbles, is inhibited even under high outgassing vacuum. Such unpurged bubbles constitute captive discontinuities which render the fluid unusable for critical cases.

An additional problem unsolved by prior art fluid purification techniques relates to the organization of the steps in a way that allows the first effluent fraction of the processed fluid to be discarded and the pure substance to be applied directly to the workpiece.

Accordingly, the following are all objects of this invention:

To successfully free a viscous fluid of microparticles and microbubbles;

To prevent the recontamination of a filtered fluid prior to the outgassing step;

To eliminate the production of microbubbles by the filter itself;

To discard the first fraction of treated fluid; and

To apply the pure fluid directly to its point of use.

These problems are solved in accordance with the invention by a method in which the fluid is forced under pressure through a membrane-type filter only after the filter itself has been outgassed, and thereafter fed directly for outgassing into a vacuum chamber. The first effluent fraction may be discarded and the pure fluid is tapped directly from the vacuum chamber.

The invention in one embodiment, hereinafter described for illustrative purposes, comprises a pressure chamber and a vacuum chamber separated by a filter assembly. The fluid is placed in the pressure chamber initially under relatively little pressure. The air present in the filter assembly, importantly that in the filter membrane, is concurrently evacuated. When a suitable vacuum level is reached, the pressure in the pressure chamber is increased to force the fluid through the filter and into the vacuum chamber. By deaerating the filter before the fluid contacts it, one avoids the problem of air entrainment occurring heretofore in the filter itself. Further, the filtrate is not recontaminated between the filtering and outgassing steps.

Pursuant to another facet of the invention, the pure fluid is extracted directly from the vacuum chamber to permit discarding of the first fraction and, advantageously, to enable direct deposition of the fluid onto a workpiece.

One broad feature of the invention, accordingly, concerns the combining in a high viscosity fluid treatment process of the heretofore separate steps of filtering and outgassing.

A further feature of the invention relates to the outgassing of the filter itself before the filtering step in the treatment of high viscosity filters.

Figure 2:
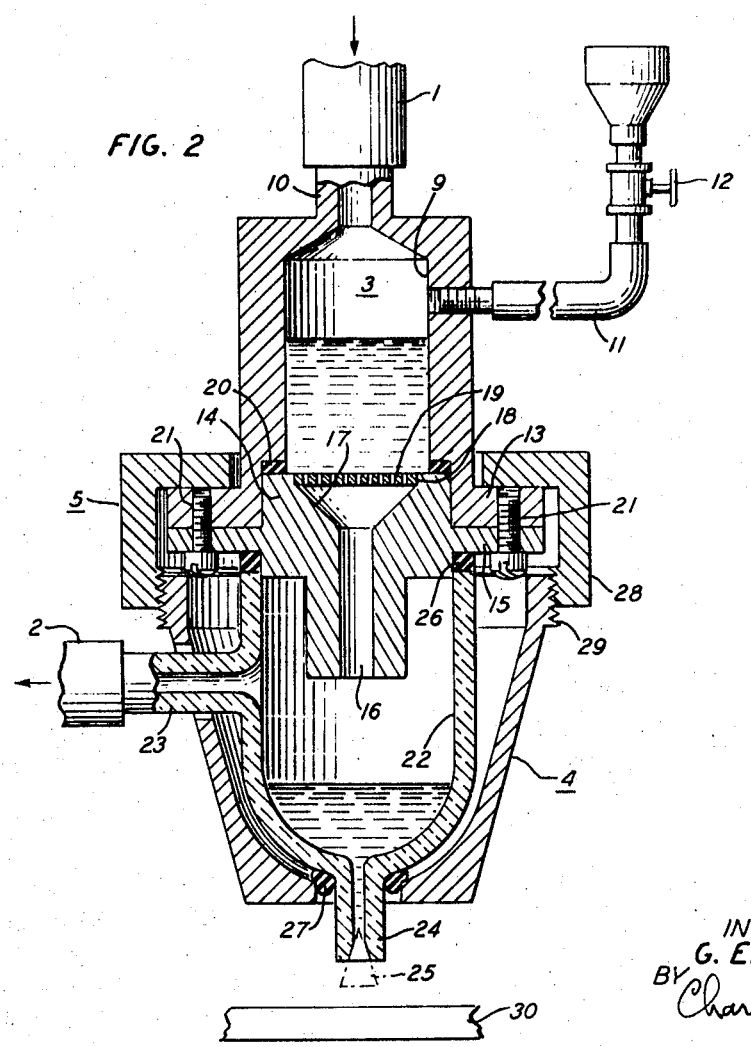

These and other objects, features and advantages of the invention will be more apparent from a reading of the description to follow of an illustrative embodiment thereof, taken in conjunction with the drawing in which:

FIG. 1 is a schematic diagram of an apparatus for carrying out the invention; and FIG. 2 is a sectional front view of the apparatus.

The overall apparatus for practicing the invention is shown in FIG. 1 as comprising a gas pressure line 1 and a vacuum line 2 connected respectively to a pressure chamber 3 and a vacuum chamber 4. These chambers are separated by a section 5 which supports the filters. Suitable regulating valves 6, 7 and 8 are located in the vacuum and pressure lines.

FIG. 2 illustrates in detail the structure of chambers 3, 4 and section 5. Chamber 3 is constructed advantageously of metal and comprises a hollow interior 9, a neck 10 to which pressure line 1 attaches, a fluid inlet 11 with a suitable pressure valve 12, and a bottom flange 13. The filter support section 5 comprises a member 14 with a peripheral flange 15 that mates with flange 13, a duct 16 and a top funnel section 17. The latter includes an annular section 18 above it which supports a filter assembly 19. This assembly comprises advantageously a perforated stainless steel sheet, a medium mesh wire and finally a fine mesh wire (none shown) which provide support for a membrane-type filter known in the art. These have a pore size of from 0.05 micron to 10 microns, depending on the degree of filtration necessary.

A rubber gasket 20 is provided around the bottom of interior 9 as a seal between chamber 3 and member 5 after they are joined by suitable means such as screws 21. Vacuum chamber 4 comprises a glass vacuum bell jar 22 which has side neck 23 attaching to vacuum line 2 and bottom neck 24 sealed, for example, by a stopper 25. The top edge of jar 22 seats around the underside of flange 15 with the aid of a gasket 26. The bell portion of jar 22 rests on a support gasket 27 located around an accommodation in the bottom of chamber 4. The latter is fixed to the assembly of member 5 and chamber 3 by a clamping ring 28 which engages threads 29 on chamber 4 and flange 13 of chamber 3.

The external surfaces of filter assembly 19 advantageously are finished with black oxide so that its temperature may be conveniently raised using an infrared heat lamp (not shown). Heating speeds up the filtration of stable high viscosity fluids, as is well known.

In a typical application of the inventive method for filtering an epoxy resin, a filter of 0.1 micron absolute pore size is used. The resin is introduced into the pressure chamber 3 and the filter assembly temperature is raised to within a range typically of 50–60° C., the specific range set by the heat dependence of the polymerization of the epoxy.

Next, the bell jar is exhausted by a trapped mechanical vacuum pump, for example, to a vacuum of better than 1 mm. of mercury. The pumping also equally exhausts the air from the filter assembly and filter membrane but is insufficient to draw the fluid therethrough. Thereafter, an air or suitable inert gas pressure sufficient to force the heated epoxy through the filter membrane is applied. The epoxy settled in the bell jar is outgassed for a period averaging five to ten minutes.

After the first fraction is discarded, the resultant product now is applied directly to a substrate, for example, such as 30. Under the above conditions, a volume of about 10 ml. can be filtered in about five minutes, which is well within the pot life of many resin formulations. It is necessary to replace the old filter membrane after each use and to maintain the parts contacting the filter at a high level of cleanliness. The entire operation should be carried out in a work space having a low particulate contamination, e.g., a laminar flow hood.

It is to be understood that the embodiments described herein are merely illustrative of the principles of the invention. Various modifications may be made thereto by persons skilled in the art without departing from the spirit and scope of the invention.

What is claimed is:

1. A method for purifying an epoxy resin destined for use as an acoustic bonding agent on a substrate, including the steps of:

mounting a membrane-type filter having a pore size of from 0.05 to 10.0 microns atop an assembly consisting of a plurality of wire mesh screens and a stainless steel perforated sheet;

disposing said filter and assembly between an upper and a lower chamber maintained at a temperature of between 50° C. and 60° C.;

introducing epoxy resin into said upper chamber without the application of pressure;

exhausting said lower chamber to a vacuum level marginally above the level sufficient to draw said resin through said filter and assembly;

thereafter, forcing said resin through said filter and assembly with pressure of an inert gas applied to the upper surface of said resin;

maintaining for a period of from 5 to 10 minutes the said vacuum level within said lower chamber while said resin is forced thereinto, thereby to outgas said resin; and thereafter applying the filtered and outgassed resin as an acoustic bonding agent directly from said lower chamber onto a substrate.

References Cited

UNITED STATES PATENTS

| | | | |
|---|---|---|---|
| 2,146,532 | 2/1939 | Crane et al. | 55—190 X |
| 3,071,808 | 1/1963 | Mackinnon | 210—188 X |
| 1,994,269 | 3/1935 | Bonniksen. | |
| 2,851,161 | 9/1958 | Dahlstrom et al. | 210—416 X |

FOREIGN PATENTS 653,008   11/1962   Canada.

REUBEN FRIEDMAN, Primary Examiner

R. W. BURKS, Assistant Examiner

U.S. Cl. X.R.

55—55; 210—406